Sept. 13, 1955   C. MAIRE ET AL   2,717,623
CLOSING DEVICE FOR ANTI-SKID CHAINS
Filed Feb. 3, 1953
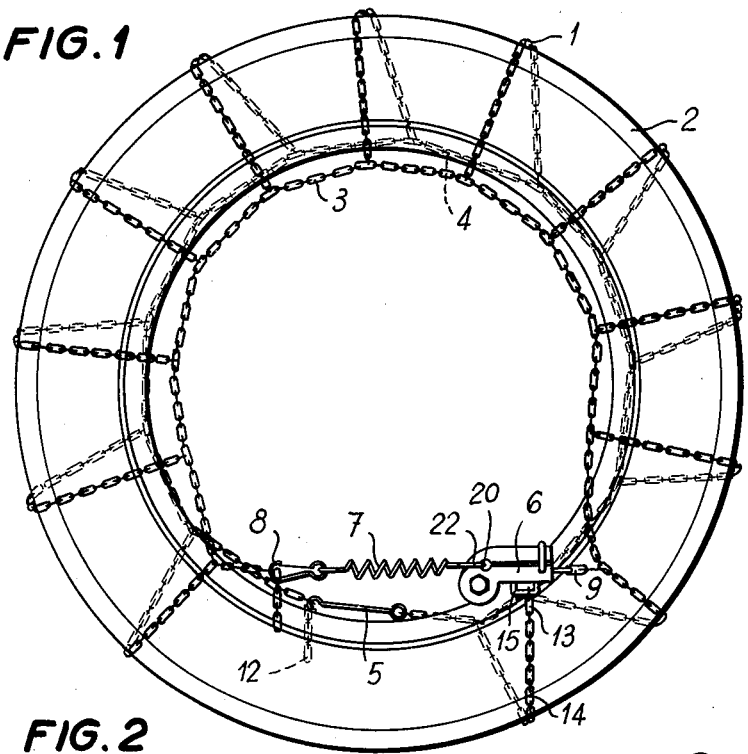
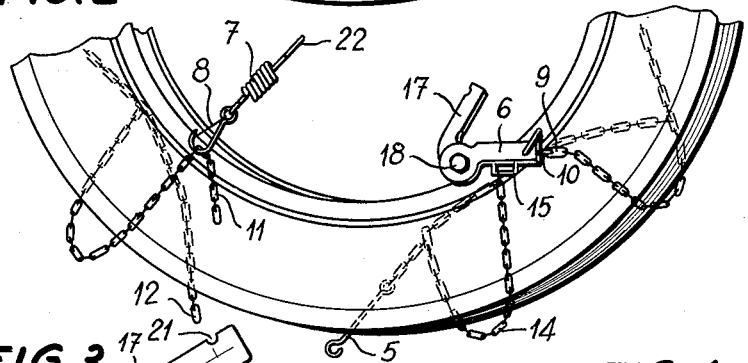
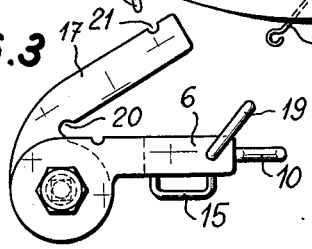

United States Patent Office 2,717,623
Patented Sept. 13, 1955

2,717,623

CLOSING DEVICE FOR ANTI-SKID CHAINS

Charles Maire and Charles Fahrni, Vaulion, Switzerland, assignors, by mesne assignments, to Adolphe-John Girardy, Lausanne, and Fred Cuendet, Penthalaz, Switzerland Application February 3, 1953, Serial No. 334,886

Claims priority, application Switzerland September 18, 1952

2 Claims. (Cl. 152—219)

My invention has for its object a device for closing anti-skid chains, sometimes termed snow chains as used for cooperating with wheels provided with a pneumatic tire, the successive elements of such chains which extend from one side of the wheel to the other over the tire tread being held in position by means of auxiliary chains positioned respectively to either side of the wheel.

According to a main feature of my invention, said closing means include a primary rough-closing system provided with a hook and adapted to interconnect the cooperating ends of the auxiliary chain lying on the side of the wheel facing the vehicle and a second, final closing tensioned system located on the outside of the wheel with reference to the vehicle, said second system being provided with an eccentric tensioning lever mounted on a body connected with the anti-skid chain, said lever being locked upon closing of the device and being associated with at least one spring that engages through one end said tensioning lever while its other end is connected with the anti-skid chain on the outside of the wheel, the whole arrangement being such that it is possible to execute a preliminary clamping of the anti-skid chain through interengagement of the detachable connecting member constituted by the hook, followed by a final clamping by means of the tensioning system.

My improved closing device including detachable hooking members allows mounting and dismantling the different chains and the whole device without it being necessary to make the wheels of the vehicle execute any movement.

I have shown by way of exemplification in accompanying drawings a preferred embodiment of my invention. In said drawings:

Fig. 1 is a complete side view of the tire, as seen from the outside of the vehicle with the device in its operative position.

Fig. 2 is a fragmentary lateral view of the tire, on which the device is shown in a half open position.

Figs. 3 and 4 are an elevational and a plan view of the eccentric lever of the tensioning system with its carrier.

Turning to Figs. 1 and 2, the reference number 1 designates the anti-skid chain, the successive elements of which arranged sideways across the tire 2 are held in position by means of the auxiliary chains 3 and 4 located to either side of the wheel and to which the ends of said strands or elements are connected.

The closing device includes, on the inside of the wheel with reference to the vehicle, a hook 5 engaging a link at the other end of the chain 4 and on the outside of the wheel a tensioning system including the body 6 and the parts 17 to 19 as disclosed hereinafter, said tensioning system being secured to the chain 3 through a snap hook 8.

The outer link 9 of the auxiliary chain 3 located on the outside of the wheel as shown in Fig. 1 is secured to an eye 10 of the tensioning system.

On the inner side of the wheel opposed to the chain 3, the end of the auxiliary chain 4 is secured to the inner end of the hook 5. The end 11 of the chain 3 is connected with the spring 7 through the snap hook 8 while the end 12 of the chain 4 is left free. Lastly the extreme strand 13 of the anti-skid chain 14 is connected with the eye 15 of the body 6 of the tensioning system.

The carrier body 6 which is slightly arcuate and that forms part of the tensioning system is provided at one end with two vertical lugs. Said lugs are perforated so as to form two bearings inside which may rock the pivot 16 of an eccentric tensioning lever 17, said pivot 16 forming a trunnion fitted over the lever 17 through a part thereof assuming a square cross-section. Said trunnion or pivot 16 carries at its end located on the outside of the wheel a six-sided or the like polygonal head 18 which allows using a wrench when it is desired to make the eccentric lever 17 rotate.

The other end of the carrier body 6 is perforated for engagement by the keeper pin 18.

The tensioning lever 17 is provided with two notches 20 and 21 adapted to engage selectively the outer loop 22 of the spring 7 and the safety ring 19.

The arrangement described is fitted on the tire from the outside without it being necessary to make the vehicle advance or recede or to raise said vehicle. It is allowed to drop freely over the tire after which the hook 5 is engaged in the end 12 of the auxiliary chain 4 so as to provide a very slight preliminary tensioning.

In order to produce the final tensioning of the anti-skid chain as soon as it is thus laid on the tire, it is necessary to draw in the spring 7 and to this end the loop 22 thereon is fittted over the tensioning lever 17 so that said loop may automatically engage the notch 20 in the latter. This being done, a wrench is fitted over the six-sided head 18 so as to make the eccentric lever 17 rotate until it engages the body 6 as illustrated in Fig. 1.

The whole arrangement is then held fast by making the safety ring 19 engage the notch 21 in the tensioning lever.

The closing device being thus securely positioned, the running of the wheel with its tire has for its result a uniformization of the tensioning of the successive elements of the anti-skid chain, the spring 7 absorbing any possible straining.

The dismantling of the described arrangement is also performed very easily without requiring any shifting of the vehicle.

What I claim is:

1. In combination with an anti-skid device for a tire-carrying vehicle wheel, including two open auxiliary chains of link construction extending circumferentially along opposite sides of the wheel adjacent the inner periphery of the tire, and a plurality of cross chain elements, connected at their ends to the auxiliary side chains in different links thereof, and a hook connected with one end of the inner auxiliary side chain and adapted releasably to hook into a selected link adjacent the other end of said inner side chain to connect the ends of said inner chain, a chain-closing system for the outer auxiliary side chain, said system including an elongated carrier connected with a first end of said outer side chain and with one of said cross elements, a lever revolubly mounted in said carrier with its axis parallel with the axis of the wheel, said lever being adapted to be shifted between an inoperative position and an operative position in which it is in contacting relationship with said carrier, said lever having a notch in its surface facing the carrier at a short distance from its axis, an elongated elastic member, a snap hook secured permanently to one end of the elastic member and releasably engaging any link in the second end portion of said outer auxiliary side chain to allow quick removal of the elastic member, a loop carried at the other end of said elastic member and adapted to be freely fitted over and around said lever and to engage the notch in the lever facing the carrier during the shifting of said lever from its operative to its inoperative position to stretch said elastic member, and detachable means for holding the lever in its operative position with reference to the carrier.

2. In combination with an anti-skid device for a tire-carrying vehicle wheel, including two open auxiliary chains of link construction extending circumferentially along opposite sides of the wheel adjacent the inner periphery of the tire and a plurality of cross chain elements, connected at their ends to the auxiliary side chains in different links thereof, and a hook connected with one end of the inner auxiliary side chain and adapted releasably to hook into a selected link adjacent the other end of said inner side chain to connect the ends of said inner chain, a chain-closing system for the outer auxiliary side chain, said system including an elongated carrier connected with a first end of said outer side chain and with one of said cross elements, a lever revolubly mounted in said carrier with its axis parallel with the axis of the wheel, said lever being adapted to be shifted between an inoperative position and an operative position in which it is in contacting relationship with said carrier, said lever having a notch in its surface facing the carrier at a short distance from its axis and a further notch in its surface facing away from the carrier, an elongated coil spring, a snap hook secured permanently to one end of the coil spring and releasably engaging any link in the second end portion of said outer auxiliary side chain to allow quick removal of the coil spring, a loop carried at the other end of said coil spring and adapted to be freely fitted over and around said lever and to engage the notch in the lever facing the carrier during the shifting of said lever from its operative to its inoperative position to stretch said coil spring and a ring pivotally secured to the carrier and adapted to be fitted over the lever to engage the second outwardly facing notch on said lever and to hold the said lever in contacting relationship with the carrier.

References Cited in the file of this patent

UNITED STATES PATENTS

| | | |
|---|---|---|
| 761,926 | Van Loghem | June 7, 1904 |
| 909,037 | Taylor et al. | Jan. 5, 1909 |
| 2,332,113 | Reed | Oct. 19, 1943 |
| 2,657,728 | Jackson | Nov. 3, 1953 |